United States Patent [19]

Hirokawa et al.

[11] Patent Number: 4,948,618

[45] Date of Patent: Aug. 14, 1990

[54] PROCESS FOR TEMPERING EDIBLE PLASTIC FAT PRODUCTS

[75] Inventors: Norio Hirokawa, Akashi; Satoshi Imai, Kobe; Hisashi Morikawa, Kakogawa, all of Japan

[73] Assignee: Kanegafuchi Chemical Industry Co., Ltd., Osaka, Japan

[21] Appl. No.: 403,782

[22] Filed: Sep. 6, 1989

Related U.S. Application Data

[63] Continuation of Ser. No. 104,559, Sep. 30, 1987, abandoned, which is a continuation of Ser. No. 833,262, Feb. 27, 1986, abandoned, which is a continuation-in-part of Ser. No. 667,831, Nov. 2, 1984, abandoned.

[30] Foreign Application Priority Data

Nov. 14, 1983 [JP] Japan ................................ 58-214642

[51] Int. Cl.$^5$ .......................... A23D 7/02; A23D 9/02
[52] U.S. Cl. ..................................... 426/603; 426/417; 426/524; 426/601; 426/604; 426/606; 426/607; 426/608

[58] Field of Search ............... 426/603, 601, 604, 606, 426/607, 608, 417, 524

[56] References Cited

U.S. PATENT DOCUMENTS

| | | | |
|---|---|---|---|
| 2,100,866 | 11/1937 | Morris | 426/603 |
| 2,101,496 | 12/1937 | Godfrey et al. | 426/417 |
| 2,101,501 | 12/1937 | Keck | 426/417 |
| 2,174,364 | 9/1939 | Godfrey et al. | 426/417 |
| 2,298,903 | 10/1942 | Schaub | 426/603 |
| 2,666,400 | 1/1954 | Vogt | 426/417 X |
| 2,997,396 | 8/1961 | North et al. | 426/603 |
| 3,488,199 | 1/1970 | Gander et al. | 426/603 |
| 3,637,402 | 1/1972 | Reid et al. | 426/417 |
| 3,985,911 | 10/1976 | Kriz et al. | 426/417 X |

Primary Examiner—Donald E. Czaja
Assistant Examiner—Evan Federman
Attorney, Agent, or Firm—Wegner & Bretschneider

[57] ABSTRACT

A process for tempering edible plastic fat products such as margarine and shortenings which comprises crystallizing with cooling a starting material of fats and oils with or without other ingredients and subjecting the resulting product to pressuring treatment.

10 Claims, No Drawings

PROCESS FOR TEMPERING EDIBLE PLASTIC FAT PRODUCTS

This application is a continuation of U.S. application Ser. No. 104,559 filed Sept. 30, 1987, now abandoned, which is a continuation of U.S. application Ser. No. 833,262 filed Feb. 27, 1986, now abandoned, which is a continuation-in-part of U.S. application Ser. No. 667,831 filed Nov. 2, 1984, now abandoned.

FIELD OF THE INVENTION

The present invention relates to a process for tempering edible plastic fat products such as margarine, shortenings and the like.

BACKGROUND OF THE INVENTION

In general, edible plastic fat products (hereinafter sometimes merely referred to as fat products) are produced by subjecting starting fats and oils or starting emulsified materials such as emulsions of fats and oils and other ingredients to plasticizing treatment such as cooling, crystallizing and kneading and, if necessary, subjecting the resulting plasticized products to a kind of aging or curing treatment, so-called "tempering". Usually, tempering is carried out by filling a fat product from plasticizing treatment into containers such as cartons and cans and maintaining them at a temperature somewhat lower than the melting point of the product for 1 to 3 days. It has been well known that tempering improves characteristic properties of a fat product such as appearance, e.g., "texture" and "gloss", melting properties in the mouth and spreadability and remarkably increases whipping ability in comparison with those before subjecting the product to tempering. Particularly, tempering is necessary for the production of a fat product used for butter cream and baked cakes such as butter cakes, cookies, etc. because whipping ability is an essential property for such a fat product. However, conventional tempering involves such problems that batch-wise operation is required and operation takes a long time because, as described above, it is carried by filling a plasticized fat product into containers. In addition, there is such a problem that, when a tempering temperature is too high or a tempering time is too long, it results in so-called oil-off, i.e., a phenomenon that liquid oil in a fat product is separated out during storage after tempering.

The present inventors have intensively studied to solve these problems in conventional processes for producing fat products. As the result, it has been found that, when pressurizing treatment is effected in addition to crystallizing with cooling and kneading of plasticizing treatment or instead of kneading after crystallizing with cooling of plasticizing treatment, a product having excellent quality wherein characteristic properties in appearance such as "texture" and "gloss", melting properties in the mouth, spreadability and, further, whipping ability are improved and oil-off is prevented can be efficiently obtained.

OBJECTS AND SUMMARY OF THE INVENTION

The main object of the present invention is to solve the above problems in conventional tempering to provide a novel process for producing edible fat products having excellent quality. That is, the main object of the present invention is to provide a novel process for tempering edible fat products.

This object as well as other objects and advantages of the present invention will become apparent to those skilled in the art from the following description.

According to the present invention, there is provided a process for tempering edible plastic fat products which comprises crystallizing with cooling a starting material of fats and oils with or without other ingredients and subjecting the resulting product to pressurizing treatment.

The term "edible plastic fat product" or "fat product" used herein means known products as plastic foods of fats and oils or plastic materials of fats and oils used for producing various foods containing crystallized fats and oils which are obtained by subjecting starting materials of fats and oils with or without other ingredients to plasticizing treatment, and include margarine, shortenings, lard, edible refined processed fats and oils, etc.

DETAILED DESCRIPTION OF THE INVENTION

In the process of the present invention, the starting material of fats and oils with or without other ingredients to be used and its composition are not specifically limited and various fats and oils and other ingredients commonly used in this kind of fat product can be used. The amount and proportion thereof can be suitably chosen according to the particular desired product.

For example, as fats and oils for the starting material, there can be used animal fats and oils such as fish oils, whale oil, lard and tallow; vegetable fats and oils such as soybean oil, cottonseed oil, corn oil, rice oil, rapeseed oil, palm oil, palm kernel oil, safflower oil, sunflower oil, kokum butter, Borneo tallow, shea butter and sal fat; and derivatives of these fats and oils such as hydrogenated, transesterified, enzymatic treated or fractionated derivatives thereof. These fats and oils can be used alone or in a combination thereof. When two or more fats and oils are used, the proportions thereof are suitably chosen according to particular properties such as the melting point of the desired product. Examples of other ingredients include various emulsifiers such as lecithin, monoglycerides, diglycerides, polyglycerides, sorbitol fatty acid esters, propylene glycol fatty acid esters and sugar fatty acid esters and further include, in case of margarine, water, fermented milk, salt, various sweetening agents, flavors, seasonings, colorants, vitamins, antioxidants, preservatives, stabilizers, etc. Usually, in case of margarine, an aqueous material such as water or fermented milk can be used in an amount of up to about 50 % by weight and an emulsifier can be added in an amount of up to about 10 % by weight based on the total weight of the product and, in case of a shortening, an emulsifier can be optionally added in an amount of up to about 10 % by weight based on the total weight of the product.

According to the process of the present invention, the desired edible plastic fat product is produced by admixing and, if necessary, emulsifying the above various fats and oils with or without other ingredients by a conventional technique and, either (1) crystallizing with cooling and, immediately after the crystallizing step, subjecting the resulting material to pressurizing treatment, or (2) crystallizing with cooling, kneading and, during or after the kneading step, subjecting the material to pressurizing treatment.

Crystallization with cooling can be carried out by using various apparatuses and conditions commonly employed in the production of this kind of products. For example, the fats and oils with or without other ingredients admixed and, if necessary, emulsified according to a conventional technique are passed through a concentric-tube heat exchanger equipped with surface scraping blades (e.g. A unit of Votator, Kombinator, Perfector, Onrator, etc.). Kneading can be also carried out by using various apparatuses and conditions commonly employed. For example, after crystallizing with cooling, the resulting material is passed through a kneader (e.g., B unit of Votator, Kombinator, Perfector, etc.). Conditions for crystallizing with cooling and kneading are suitably chosen according to varieties and properties of the starting material and the properties of the desired product. By the way, as is clear from the above description, kneading is not necessarily required in the process of the present invention because the same effect can be obtained during the pressurizing treatment.

The pressurizing treatment in the process of the present invention is carried out by holding the product at a suitable temperature and pressure for a suitable period of time either immediately after the crystallizing step or, during or after the kneading step. The pressure to be applied is higher, the effect on improvement of characteristic properties in appearance, melting properties in the mouth and spreadability as well as on increase of whipping ability are developed within a shorter period of time. The period to be required for the pressurizing treatment varies depending upon the pressure and the temperature employed. However, when the treatment is carried out at a defined temperature and pressure, the effect obtained by the treatment firstly increases with the elapse of time and, after the elapse of a certain period of time, characteristic properties of the product is no more improved. In practice, it is preferable to choose the pressure and period so that the treatment can be carried out by an on-line operation. As described above, the pressure to be applied is higher, the effect of the treatment is obtained within a shorter period of time. However, in practice, the upper limit of the pressure to be applied is that being feasible for a particular apparatus to be employed. Thus, in general, although conditions of the pressurizing treatment can be varied depending upon the starting material used and the desired product, it is preferable to carry out the treatment at a temperature of 10 to 45° C. and a pressure of 5 kg/cm² G or more from the practical viewpoint. The operation of the pressurizing treatment itself is not limited to a specific one. However, it is preferable to provide a pressurizing zone controlled to the above temperature and pressure conditions to just behind a heat exchanger or a kneader to immediately pressurize the resulting material by a continuous operation. As the pressurizing means for this purpose, there can be used a temperature controllable Mohono pump, screw pump, pressurized extruder such as twin screw extruder or the like.

The fat product thus produced is filled into containers and wrapped up according to a known method to obtain the end product.

Thus, although the mechanism is not clear, characteristic properties in appearance such as "texture" and "gloss", melting properties in the mouth and spreadability of the resulting fat product are significantly improved and whipping ability thereof is also increased by effecting pressurizing treatment according to the process of the present invention to obtain the fat product of excellent quality. In addition, according to the process of the present invention, the product obtained can be used over a temperature range significantly wider than that of a product obtained by a conventional process and therefore, even if taking in and out of the product from a refrigerator are repeated, quality and properties thereof are hardly varied. Further, even in case of a product which hitherto requires tempering, a conventional batch-wise tempering operation which takes a long time can be replaced by a continuous operation which takes only a short time. Furthermore, it is possible to precisely control a temperature and therefore oil-off can be prevented to the utmost.

The following examples further illustrate the present invention in detail but are not to be construed to limit the scope thereof. In the examples, all "parts" are by weight unless otherwise stated. Whipping ability test was carried out by adjusting each of the resulting fat product and a syrup to 20° C., admixing 40 g of the syrup with 100 g of the fat product, stirring the resulting mixture in a vertical mixer equipped with Meyer hopper and measuring the specific volume of the mixture after stirring for 10, 15 and 20 minutes. Whipping ability (hereinafter referred to as C.V.) is expressed as 100 times of the value of air volume (ml) incorporated into 1 g of the fat product. The product having sufficient whipping ability shows 200 or more of C.V. value after 20 minutes in this estimation. Characteristic properties in appearance, melting properties in the mouth, spreadability, etc. were organoleptically estimated.

EXAMPLE 1

A starting material of fats and oils (82.9 parts) composed of lard (10 %), hardened cottonseed oil (10 %, iodine value (I.V.): 77, m.p.: 31° C.) and hardened fish oil (80 %, I.V.: 82, m.p.: 30° C.), water (16.8 parts) and emulsifiers [0.3 part (monoglyceride (0.2 part) and lecithin (0.1 part))] were mixed and emulsified according to a standard method. The resulting emulsion was passed through a concentric-tube heat exchanger equipped with surface scraping blades at the flow rate of 50 kg/hour to cool and crystallize the material. The material was further passed through a kneader to effect plasticizing treatment to obtain margarine to be used for both butter cream and spreading on bread. The temperatures at the inlet and the outlet of the heat exchanger were 50° C. and 12° C., respectively. The temperature at the outlet of the kneader was 19° C. The melting point of the margarine thus obtained was 31° C.

The margarine was further subjected to each one of the following treatments and C.V. value and organoleptical estimation of characteristic properties of a sample of the product from each treatment were conducted.

Sample 1-1: Margarine without any treatment.

Sample 1-2: Margarine treated by filling in cartons and holding at 25° C. for 30 hours (conventional tempering).

Sample 1-3: Margarine treated by pressurizing with a piston in a cylinder at 25° C., 3 kg/cm² G for 25 hours (pressurizing treatment).

Sample 1-4: Margarine treated by pressurizing at 20° C., 5 kg/cm² G for 10 hours according to the same manner as in Sample 1-3 (pressurizing treatment).

Sample 1-5: Margarine treated by pressurizing at 20° C., 10 kg/cm² G for 10 hours according to the same manner as in Sample 1-3 (pressurizing treatment).

Sample 1-6: Margarine treated by pressurizing at 25° C., 10 kg/cm² G for 5 minutes (pressurizing treatment).

Sample 1-7: Margarine treated by pressurizing at 25° C., 20 kg/cm² G for 3 minutes (pressurizing treatment).

C.V. values of these samples are shown in Table 1.

TABLE 1

| Samples | After 10 min. | After 15 min. | After 20 min. |
| --- | --- | --- | --- |
| 1-1 | 72 | 93 | 85 |
| 1-2 | 164 | 210 | 225 |
| 1-3 | 160 | 187 | 217 |
| 1-4 | 145 | 170 | 208 |
| 1-5 | 175 | 217 | 233 |
| 1-6 | 180 | 223 | 245 |
| 1-7 | 183 | 232 | 247 |

As is seen from Table 1, the sample treated by pressurizing treatment even for a short period of time according to the present invention has excellent whipping comparable to that of the sample treated only by conventional tempering (1-2). Particularly, the sample treated at a higher pressure (1-5 to 1-7) shows excellent whipping ability in spite of the very short treating time.

As the result of an organoleptic test, it was found that the samples except Sample 1-1 satisfied all the characteristic properties. Particularly, characteristic properties in appearance, melting properties in the mouth and spreadability of Samples 1-5 to 1-7 were extremely superior to those of Sample 1-2 treated by a conventional tempering. Further, even taking in and out from a refrigerator were repeated, properties of Samples 1-5 to 1-7 were hardly varied and they showed sufficient spreadability over a wide temperature range of 10° to 25° C.

EXAMPLE 2

A starting material of fats and oils (83.6 parts) composed of lard (10 %) and hardened fish oil (90 %, I.V.: 85, m.p.: 31.5° C.), water (16.1 %) and emulsifiers [0.3 part (monoglyceride (0.2 part) and lecithin (0.1 part))]were mixed and emulsified according to a standard method. According to the same manner as in Example 1, the resulting emulsion was subjected to plasticizing treatment at the flow rate of 1,700 kg/hour to obtain margarine to be used for both butter cream and spreading on bread. The temperatures at the inlet and the outlet of the heat exchanger were 43° C. and 10° C., respectively. The temperature at the outlet of the kneader was 18° C. The melting point of the margarine obtained was 31.3° C.

The margarine was further subjected to each one of the following treatments and C.V. value and organoleptical estimation of characteristic properties of a sample of the product from each treatment were conducted.

Sample 2-1: Margarine treated by filling into cartons and holding at 27° C. for 48 hours (conventional tempering).

Sample 2 2: Margarine treated by pressurizing with a piston in a cylinder at 25° C., 10 kg/cm² G for 5 minutes (pressurizing treatment).

Sample 2-3: Margarine treated by pressurizing at 27° C., 10Kg/cm² G for 5 minutes (pressurizing treatment).

C.V. values of these samples are shown in Table 2.

TABLE 2

| Samples | After 10 min. | After 15 min. | After 20 min. |
| --- | --- | --- | --- |
| 2-1 | 174 | 234 | 245 |
| 2-2 | 181 | 225 | 238 |
| 2-3 | 198 | 237 | 255 |

As is seen from Table 2, the sample treated by pressurizing treatment according to the present invention shows excellent whipping ability in spite of a very short treating time.

As the result of an organoleptic test, all of these samples showed satisfactory characteristic properties. Particularly, Sample 2-3 showed excellent spreadability over a wide temperature range and melted in the mouth quickly.

EXAMPLE 3

A starting material of fats and oils (82.7 parts) composed of lard (15 %) and hardened fish oil (85 %, I.V.: 82, m.p.: 31.7° C.), water (17.0 parts) and emulsifiers [0.3 part (monoglyceride (0.2 part) and lecithin (0.1 part))]were mixed and emulsified according to a standard method. The resulting emulsion was passed through a concentric-tube heat exchanger equipped with surface scraping blades at the flow rate of 48 kg/hour to cool and crystallize the material. The material was passed through a kneader to obtain a sample of margarine (Sample 3-1). Separately, the crystallized material was passed through a Mohono pump to subject pressurizing treatment to obtain another sample of margarine (Sample 3-2). The temperatures at the inlet and the outlet of the heat exchanger were 50° C. and 11° C., respectively. The temperature at the outlet of the kneader was 16° C. The pressurizing treatment was carried out under the following conditions: pump inlet temperature: 18° C., pressure: 15 kg/cm² G and retention time in pump: about 2 minutes. The melting point of each of the samples obtained was 31.5° C.

C.V. values of the samples are shown in Table 3.

TABLE 3

| Samples | After 10 min. | After 15 min. | After 20 min. |
| --- | --- | --- | --- |
| 3-1 | 75 | 77 | 81 |
| 3-2 | 213 | 250 | 260 |

As is seen from Table 3, whipping ability of the sample subjected to pressurizing treatment is significantly increased. Further, in an organoleptic test, this latter sample showed excellent spreadability over a wide temperature range and melted in the mouth very quickly.

EXAMPLE 4

A starting material of fats and oils (99.8 parts) composed of hardened corn oil (50 %, I.V.: 70, m.p.: 35° C.) and hardened fish oil (50 %, I.V.: 71, m.p.: 36° C.) and emulsifiers [0.2 part (monoglyceride (0.1 part) and lecithin (0.1 part))]were mixed and passed through a concentric-tube heat exchanger equipped with surface scraping blades at the flow rate of 55 kg/hour. The resulting product was filled into containers and subjected to tempering according to a conventional method to obtain a shortening sample (Sample 4-1). Separately, after crystallization, the material was subjected to pressurizing treatment by passing through a Mohono pump to obtain another shortening sample (Sample 4-2). The temperatures at the inlet and the outlet of the heat exchanger were 55° C. and 14° C., respectively. The pressurizing treatment was carried out under the following conditions: pump inlet temperature: 15° C., pressure: 20kg/cm$^2$ G and retention time in pump: about 2 minutes. The melting point of each of the samples was 34° C.

C.V. values of the samples are shown in Table 4.

TABLE 4

| Samples | After 10 min. | After 15 min. | After 20 min. |
|---|---|---|---|
| 4-1 | 165 | 203 | 227 |
| 4-2 | 189 | 234 | 258 |

As is seen from Table 4, the sample subjected to pressurizing treatment shows excellent whipping ability even without tempering.

Further, as the result of an organoleptic test, both samples showed satisfactory characteristic properties. Particularly, the sample treated by pressurizing treatment showed excellent spreadability.

The samples of Examples 1 to 4 were stored at room temperature for 14 days. After storage, occurrence of oil-off of each sample was observed. As the result, no oil-off was observed in the sample subjected to pressurized treatment.

What is claimed is:

1. A process for aging an edible plastic fat product, consisting essentially of crystallizing a starting fat product with cooling to obtain a crystallized fat product, and subjecting the crystallized fat product to a pressurizing treatment at a temperature of 10° to 45° C. and a pressure of 5 kg/cm$^2$·G or more.

2. A process as recited in claim 1, wherein the pressurizing treatment is carried out with a twin screw extruder.

3. A process as recited in claim 1, wherein the pressurizing treatment is carried out with a pump means for generating high pressure.

4. A process as recited in claim 1, wherein the pressurizing treatment is carried out with a piston in a cylinder.

5. A process as recited in claim 1, wherein the pressurizing treatment is a continuous operation.

6. A process as recited in claim 1, wherein the pressurizing treatment is a batch-wise operation.

7. A process as recited in claim 1, wherein said starting fat product includes at least one fat or oil ingredient selected from the group consisting of an animal fat or oil and a vegetable fat or oil.

8. A process as recited in claim 7, wherein said starting fat product further includes at least one ingredient selected from the group consisting of an emulsifier, water, fermented milk, salt, a sweetening agent, a flavoring, a colorant, a vitamin, a preservative and a stabilizer.

9. A process as recited in claim 8, wherein said starting fat product is a margarine.

10. A process as recited in claim 8, wherein said starting fat product is a shortening.

* * * * *